(12) United States Patent
Kovalenko et al.

(10) Patent No.: US 9,398,158 B2
(45) Date of Patent: *Jul. 19, 2016

(54) SYSTEM AND METHOD FOR MANAGING TRAFFIC BURSTS FOR A PLURALITY OF TENANTS

(71) Applicant: Genesys Telecommunications Laboratories, Inc., Daly City, CA (US)

(72) Inventors: Galina Kovalenko, Walnut Creek, CA (US); Slava Sayko, Walnut Creetk, CA (US); Slava Zhakov, Burlingame, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,244

(22) Filed: Sep. 5, 2014

(65) Prior Publication Data

US 2014/0376382 A1   Dec. 25, 2014

Related U.S. Application Data

(63) Continuation of application No. 13/668,175, filed on Nov. 2, 2012, now Pat. No. 8,879,712, which is a continuation of application No. 13/607,592, filed on Sep. 7, 2012.

(51) Int. Cl.
*H04M 3/00* (2006.01)
*H04M 5/00* (2006.01)
(Continued)

(52) U.S. Cl.
CPC .............. *H04M 3/5237* (2013.01); *H04L 43/04* (2013.01); *H04L 43/0882* (2013.01);
(Continued)

(58) Field of Classification Search
CPC ............ H04M 3/5237; H04M 3/2227; H04M 3/5183; H04M 3/5191; H04M 3/5233; H04M 3/5235; H04M 3/5238; H04L 43/04
See application file for complete search history.

(56) References Cited

U.S. PATENT DOCUMENTS 5,452,350 A   9/1995   Reynolds et al.
5,918,213 A   6/1999   Bernard et al.
(Continued)

FOREIGN PATENT DOCUMENTS

EP   2893677         7/2015
WO   2014039865 A1   3/2014

OTHER PUBLICATIONS

International Search Report and Written Opinion for PCT/US2013/058572, mailed on Dec. 26, 2013, 15 pages.
(Continued)

*Primary Examiner* — Oleg Asanbayev
(74) *Attorney, Agent, or Firm* — Lewis Roca Rothgerber Christie LLP

(57) ABSTRACT

A system that supports multiple contact centers includes a communications network that is coupled between a private network (e.g. MPLS network) and a remote computing environment (e.g. cloud environment). A server system in the remote computing environment monitors health of different network segments (e.g. bandwidth of the connection between the communications network and the remote computing environment, bandwidth of a link used by a tenant to access the private network, etc.). When it is determined that quality of service for voice conversations for one or more contact centers is at risk due to a health status parameter of a network segment reaching a threshold, an appropriate system reaction is triggered. The system reaction may be to offload future calls to a peer remote computing environment to service future calls. The system reaction may also be to cancel outbound campaigns, provide pre-determined "sorry" messages, and the like.

20 Claims, 12 Drawing Sheets

(51) Int. Cl.
*H04M 3/523* (2006.01)
*H04M 3/51* (2006.01)
*H04L 12/26* (2006.01)
*H04M 3/22* (2006.01)
*H04L 12/707* (2013.01)
*H04L 29/06* (2006.01)

(52) U.S. Cl.
CPC ............... *H04L 43/16* (2013.01); *H04L 45/22* (2013.01); *H04L 65/80* (2013.01); *H04M 3/2227* (2013.01); *H04M 3/5183* (2013.01); *H04M 3/5191* (2013.01); *H04M 3/5233* (2013.01); *H04M 3/5235* (2013.01); *H04M 3/5238* (2013.01); *H04M 3/523* (2013.01); *H04M 2203/406* (2013.01); *H04M 2203/407* (2013.01)

(56) References Cited

U.S. PATENT DOCUMENTS

| | | | |
|---|---|---|---|
| 6,683,947 B2 | 1/2004 | Roelle et al. | |
| 6,697,858 B1 | 2/2004 | Ezerzer et al. | |
| 6,744,877 B1 | 6/2004 | Edwards | |
| 6,910,074 B1 | 6/2005 | Amin et al. | |
| 7,023,979 B1 | 4/2006 | Wu et al. | |
| 7,698,182 B2 | 4/2010 | Falcone et al. | |
| 8,102,992 B2 | 1/2012 | Paden et al. | |
| 8,675,860 B2 | 3/2014 | Eicholz et al. | |
| 8,879,712 B2 | 11/2014 | Kovalenko et al. | |
| 9,143,616 B2 | 9/2015 | Kovalenko et al. | |
| 9,270,827 B2 | 2/2016 | Kovalenko et al. | |
| 2004/0103194 A1 | 5/2004 | Islam et al. | |
| 2005/0190750 A1 | 9/2005 | Kafka et al. | |
| 2007/0070980 A1 | 3/2007 | Phelps et al. | |
| 2008/0082858 A1 | 4/2008 | Hasegawa | |
| 2008/0313259 A1 | 12/2008 | Correa | |
| 2009/0245113 A1 | 10/2009 | Kamiya | |
| 2010/0118877 A1 | 5/2010 | Devine et al. | |
| 2010/0162394 A1 | 6/2010 | Chin et al. | |
| 2010/0238834 A9 | 9/2010 | Awais | |
| 2010/0309906 A1 | 12/2010 | Ramachandran et al. | |
| 2011/0131331 A1 | 6/2011 | Brunson et al. | |
| 2012/0057598 A1 | 3/2012 | Wang et al. | |
| 2013/0339781 A1 | 12/2013 | Wamorkar et al. | |
| 2014/0071980 A1 | 3/2014 | Kovalenko et al. | |
| 2014/0072116 A1 | 3/2014 | Kovalenko et al. | |
| 2014/0075009 A1 | 3/2014 | Kovalenko et al. | |
| 2016/0014186 A1 | 1/2016 | Kovalenko et al. | |

OTHER PUBLICATIONS

Canada Office action and Examination Search Report for Application No. 2,885,822, dated Feb. 11, 2016, 5 pages.
Australian Office action for Application No. 2013312345, dated Oct. 1, 2015, 3 pages.
Korean Intellectual Property Office Notice of Preliminary Rejection and English Translation for Korean Application No. 10-2015-7008944, dated Apr. 7, 2015, 11 pages.

FIG. 7

| | | |
|---|---|---|
| 402 — | TYPICAL NUMBER OF VOICE CONVERSATION IN PROGRESS | 5 |
| 404 — | MAXIMUM EXPECTED NUMBER OF VOICE CONVERSATION IN PROGRESS | 10 |
| 406 — | CONFIGURED AGENTS | 45 |
| 408 — | ACTIVE AGENTS | 15 |
| 410 — | REGULAR AGENTS (1ST TIER SUPPORT) | 10 |
| 412 — | HIGH-SKILLED AGENTS (3RD TIER SUPPORT) | 5 |
| 414 — | CONFIGURED SUPERVISORS | 6 |
| 416 — | ACTIVE SUPERVISORS | 2 |

| TOTAL NUMBER OF END-CUSTOMERS CURRENTLY SERVED 152 | SIMULTANEOUSLY ESTABLISHED VOICE CONVERSATIONS ||||| BANDWIDTH CONSUMPTION ||
|---|---|---|---|---|---|---|---|
| | AGENTS PER CONVERSATION 170 ||||| VOICE ONLY 158 (Mbps) | TOTAL (INCLUDING BANDWIDTH FOR SIP SIGNALING ETC., 20%) (Mbps) |
| | 1 | 2 | 2 | 1 | 1 | | |
| | DIRECT CONVERSATIONS (AGENT–END-CUSTOMER) 160 | MULTI-PARTY CONVERSATIONS (CONFERENCE: TWO AGENTS AND END-CUSTOMER) 162 | CONSULT CALLS (AGENT–AGENT; END-CUSTOMER IS ON HOLD) 164 | SUPERVISED CALLS (SUPERVISOR–AGENT–END-CUSTOMER) 166 | OUTBOUND CAMPAIGN (AGENT WAITING FOR AN END-CUSTOMER) 168 | TOTAL (VOICE CONVERSATIONS OR AGENTS AND SUPERVISORS INVOLVED) 154 | |
| 5 | 5 | | | | | 5 | 0.43 | 0.54 |
| 5 | 3 | 2 | | | 3 | 10 | 0.86 | 1.07 |
| 7 | 2 | 2 | 2 | 1 | 1 | 13 | 1.01 | 1.40 |
| 12 | 12 | | | | | 12 | 1.03 | 1.29 |
| 10 | 6 | 2 | 1 | 1 | | 14 | 1.20 | 1.50 |
| 8 | 2 | 3 | 3 | | | 14 | 1.20 | 1.50 |
| 7 | | 4 | 3 | | | 14 | 1.20 | 1.50 |
| 10 | 6 | 2 | 1 | 1 | 1 | 15 | 1.29 | 1.61 |
| 9 | 3 | 3 | 3 | | 1 | 16 | 1.38 | 1.72 |
| 8 | 1 | 4 | 3 | 1 | 2 | 17 | 1.46 | 1.83 |

SYSTEM AND METHOD FOR MANAGING TRAFFIC BURSTS FOR A PLURALITY OF TENANTS

CROSS-REFERENCE TO RELATED APPLICATIONS

This application is a continuation of U.S. application Ser. No. 13/668,175, filed Nov. 2, 2012, which is a continuation of U.S. application Ser. No. 13/607,592, filed Sep. 7, 2012, the content all of which are incorporated herein by reference.

BACKGROUND

Public wide area networks like the Internet are operated by hundreds of Internet Service Providers, each responsible for a segment of the network. No single entity in this public environment is responsible for how packets are routed from beginning to end. Thus, packets traversing the Internet often encounter congestion, significant jitter, and even loss. For some communications more than others, such as, for example, voice over IP (VoIP) communications or other real time media communications, it is important to provide preferential delivery service to avoid the uncertainties of traversing the Internet. However, the public Internet generally does not provide end-to-end QoS guarantees desired for VoIP communications. It is typical to overcome the limitations of the public Internet with moving the Voice communications to private networks, such as MPLS, where Quality of service (QoS) guarantees help provide such preferential delivery service by ensuring sufficient bandwidth, controlling latency and jitter, and reducing data loss.

Unexpected call bursts may also affect call quality of existing and future calls. With respect to customer contact centers, existing solutions attempt to manage such unexpected call bursts. Such solutions may monitor available contact center resources such as, for example, servers, agents, and media ports. If shortage or failure of a particular resource is detected, a particular action is triggered. For example, the action may be to keep a calling party on hold if shortage of agents are detected, switch to a backup server if failure of a current server is detected, or monitor a number of active calls and alert a systems administrator or refuse establishing conversations for new calls once a threshold is reached. Although such solutions may be acceptable to situations where a single contact center (referred to as a tenant) utilizes system resources and where such resources are predetermined and pre-allocated, it may not be acceptable in situations where multiple tenants are supported and resources are shared. In addition, such existing solutions do not take into account the quality of established voice conversations in efforts to provide a particular level of quality for the established voice conversations. Furthermore, existing solutions generally do not allow a buffer for gracious and gradual degradation of service. For example, existing contact center systems may abruptly start refusing new conversations when a particular threshold is reached, which may result in negative end user experience and loss of customers for the contact center.

Accordingly, what is desired is a system and method for managing voice and other media traffic associated with contact centers when such system supports multiple tenants that share resources.

SUMMARY OF THE INVENTION

According to one embodiment, the present invention is directed to a system and method for managing media traffic for a plurality of customer contact centers. The system includes first and second server systems in respectively first and second computing environments, where the first and second server systems host contact center applications for processing communication to and from the one or more contact centers. The system also includes an edge device deployed in a first communications network for facilitating a first communication involving a first end device and for signaling the first server system to service the first communication. Media traffic is transmitted between the first end device and the first server system during the first communication in response to the servicing. The servicing invokes a first contact center application hosted by the first server system. Further, the media traffic traverses a first network link coupling the first communications network and the first computing environment. The first server system is configured to monitor status of the first network link and in response to the monitoring, signal the second server system in the second computing environment to service a second communication involving a second end device. The servicing of the second communication invokes a second contact center application hosted by the second server system.

According to one embodiment of the invention, the first and second communications are voice communications.

According to one embodiment of the invention, the media traffic is voice traffic.

According to one embodiment of the invention, the first and second computing environments are cloud computing environments.

According to one embodiment of the invention, the monitoring of the status of the first network link includes monitoring the bandwidth of the first network link.

According to one embodiment of the invention, a second communications network is coupled to the first communications network over a second network link. The second communications network is coupled to the second computing environment. The first server system is further configured monitor status of the second network link and select the second computing environment for servicing the second communication based on the monitored status of the second network link.

According to one embodiment of the invention, the second communication is configured to generate traffic that traverses the second network link.

According to one embodiment of the invention, a second communications network is coupled to the second computing environment over a second network link. The first server system is further configured monitor status of the second network link and select the second computing environment for servicing the second communication based on the monitored status of the second network link.

According to one embodiment of the invention, the first server system is configured to select a media type. The first server system is configured to signal the second server system in the second computing environment if the second communication is of the selected media type. The selected media type may be a voice treatment in an outbound campaign by one or more of the plurality of customer contact centers, a voice treatment for an inbound call directed to one or more of the plurality of customer contact centers, or a multi-party call.

According to one embodiment of the invention, the first server system is configured to select a contact center service level from a plurality of available service levels, and further configured to signal the second server system in the second computing environment if the second communication is associated with a customer contact center assigned to the selected contact center service level.

According to one embodiment of the invention, the first end device accesses a private network over a second link, where the private network is coupled to the first communications network. The first server system is configured to identify one of the plurality of customer contact centers associated with the first communication, determine availability of the second link for the identified customer contact center, and in response to the determined availability, trigger an action for preserving a particular quality of service for the voice communication.

According to one embodiment of the invention, availability of the second link includes determining estimated available bandwidth of the second link.

According to one embodiment of the invention, the second link is accessed by an agent of the identified customer contact center via the first end device.

According to one embodiment of the invention, the triggered action is canceling an outbound campaign for the identified customer contact center.

According to one embodiment of the invention, the triggered action is activating a greeting for delivery to the first end user, where the greeting for indicating inability for servicing the voice communication.

According to one embodiment of the invention, the first end device accesses the first communications network over a second link coupling the first communications network to a private network. The first server system is configured to determine availability of the second link based on calls traversing the second link. In response to the determined availability of the second link, the first server system is configured to trigger an action with respect to calls associated with contact centers subscribed to a first service level for preserving a particular quality of service for calls associated with contact centers subscribed to a second service level different from the first service level.

According to one embodiment of the invention, the second link is shared by customers of the contact centers subscribed to the first and second service levels.

According to another embodiment, the present invention is directed to a system for managing media traffic associated with a plurality of customer contact centers where the system includes an edge device deployed in a communications network for facilitating calls between agents and customers of the plurality of contact centers. The agents and customers access the communications network respectively over agent and customer private networks. The agents connect to the agent private network via a first link, and the customers connect to the communications network via a second link traversing the customer private network. A server system in a computing environment coupled to the communications network is configured to identify calls between the agents and the customers; identify one of the plurality of customer contact centers associated with the identified calls; determine availability of the first link for the identified customer contact center; and in response to the determined availability for the identified customer contact center, triggering an action for preserving a particular quality of service for the identified customer contact center.

According to another embodiment, the present invention is directed to a system for managing media traffic associated with a plurality of customer contact centers where the system includes an edge device deployed in a communications network for facilitating calls between agents and customers of the plurality of contact centers. The agents and customers access the communications network respectively over agent and customer private networks. The agents connect to the agent private network via a first link, and the customers connect to the communications network via a second link traversing the customer private network. A server system in a computing environment coupled to the communications network is configured to identify calls between the agents and the customers; determine availability of the second link based on the identified calls traversing the second link; and in response to the determined availability of the second link, trigger an action with respect to calls associated with contact centers subscribed to a first service level for preserving a particular quality of service for calls associated with contact centers subscribed to a second service level different from the first service level.

A person of skill will recognize that the dynamic management and redistribution of contact center media traffic helps provide well-timed reaction to bandwidth saturation, status change of redundant links, and other "health" related information.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 7 is a semi-schematic, conceptual layout diagram of a portion of a tenant's profile record providing information on call resources available to the tenant according to one embodiment of the invention;

FIG. 9 is a semi-schematic, conceptual layout diagram of a bandwidth consumption table storing information on a bandwidth of a tenant MPLS link that is estimated to be consumed for a particular tenant according to one embodiment of the invention;

DETAILED DESCRIPTION

In general terms, embodiments of the present invention are directed to a system that supports multiple contact centers (referred to as tenants) and manages resources and invokes actions for preserving a particular quality of service for calls (voice and/or real time media traffic) between agents and customers associated with the various contact centers. The system includes a communications network that is coupled between a private network (such as an MPLS network) and a remote computing environment (such as a cloud environment). One or more servers in the remote computing environment monitor health status parameters of different network segments. For example, the servers may monitor network connectivity of tenants to the private network, shared network connectivity of the tenants to the communications network, shared network connectivity of the customers to the communications network, connectivity between the communications network and the remote computing environment in local and peer regions, and/or connectivity between the communications network and other communications networks in peer regions. The monitoring may indicate insufficient resources (e.g. bandwidth saturation) or unacceptable quality of the media communication on a particular network segment.

According to one embodiment, the one or more servers are configured to identify the connections that are impacted once a call between a customer and an agent of a contact center is in progress. In the event of unexpected call bursts affecting one or more contact centers, the system is configured to handle the call bursts in a graceful manner with controllable service degradation for newly arriving calls with regards to the level/class of services and call profiles to which the different contact centers have subscribed.

According to one embodiment, the system maintains a number of thresholds per network segment, including capacity and quality related metrics. When it is determined that quality of service for voice conversations and other real time media communication (collectively referred to as voice conversations or calls), is at risk due to one or more health status parameters of a network segment reaching a threshold, an appropriate system reaction is triggered. The system reaction may be to invoke a customized voice treatment, allow the customers to leave a voice mail of a pre-defined duration, redirect the call to an external voice mail system, request a call back at a later time, or provide another pre-determined "sorry" message. The providing on behalf of a particular tenant the gradual service degradation and customization of voice treatments is based on whether the particular tenant has subscribed to such service. By subscribing to the service, contact centers can be assured that new calls that cannot be immediately serviced will be gracefully turned away if necessary.

Figure 1:
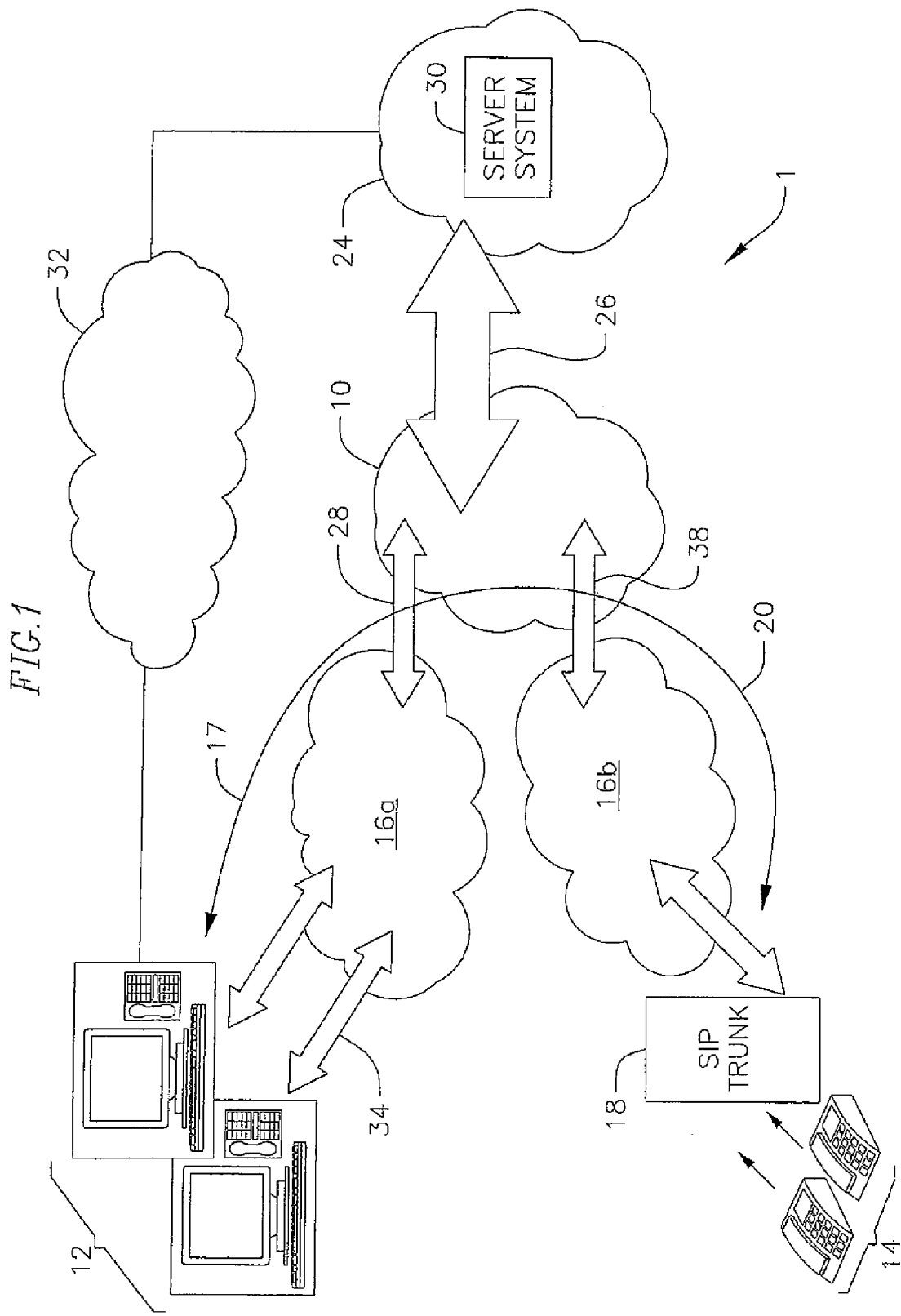
FIG. 1 is a schematic block diagram of a system for dynamic management and Redistribution of contact center media traffic according to one embodiment of the invention.

FIG. 1 is a schematic block diagram of a system 1 for dynamic management and redistribution of contact center media traffic according to one embodiment of the invention. The system includes a communications network 10 which, according to one embodiment, is dedicated to facilitate calls between agents 12 of various contact centers, and customers and other end users 14. The calls may include, for example, VoIP communication and any other media (e.g. Real-time Transport Protocol (RTP)) communication conventional in the art. The calls are controlled by any signaling protocol configured to control communication sessions over the Internet, such as, for example, session initiation protocol (SIP), H.323, and the like.

The dedicated communications network 10 is coupled to one or more private networks 16a, 16b (collectively referenced as 16) over network connection(s) 28, 38, and to one or more remote computing environments 24 over network connection(s) 26. The private networks 16 may be managed by one or more telecommunications companies that provide quality of service guarantees for VoIP calls traversing the private networks according to provider policies and limits of service ordered by its customers. According to one embodiment, the private networks 16 implement MPLS (Multi-Protocol Label Switching) for transmitting VoIP communication. Although MPLS is used as an example, a person of skill in the art should recognize that any other mechanism in addition or in lieu of MPLS may be used for ensuring quality of service guarantees, bit rates, and bandwidth for calls traversing the private networks. Due to the quality of service guarantees provided by the private networks 16, consistent call quality and security can generally be expected for those calls while traversing the private networks.

According to one embodiment, agents for a particular tenant access the private network 16a over link 34 (hereinafter referred to as tenant MPLS link). The amount of bandwidth provided by link 34 for the particular tenant depends on the type of connection ordered by the tenant from the telecommunications company managing the private network. End users 14 communicating over traditional public switched telephony network (PSTN) access the private network 16b for VoIP communication via a SIP trunk equipment 18. Although a SIP trunk equipment 18 is used according to one embodiment for accessing the private network 16b, a person of skill in the art should recognize that any other device for allowing legacy phone systems access to the private network 16b for VoIP communication may be used in addition or in lieu of the SIP trunk.

According to one embodiment, the SIP trunk equipment 18a establishes a link 38 (hereinafter referred to as the SIP trunk link) between the SIP trunk equipment 18 and the dedicated communications network 10 over the private network 16b. The SIP trunk link 38 includes dedicated access circuits on the private network 16b for accessing the dedicated communications network 10. The SIP trunk link 38 is shared by the customers 14 to access the dedicated communications network 10.

According to one embodiment, the remote computing environment 24 is a cloud computing environment that utilizes public and/or private cloud servers. According to one embodiment, instead of hosting all of the contact center applications at servers located in the dedicated communications network, the applications are hosted by a server system 30 in the remote computing environment 24. Such contact center applications include but are not limited to applications that provide VoIP signaling, voice treatments (e.g. interactive voice response applications), multi-call management (e.g. conference calls), and the like.

When a contact center receives an inbound call or engages in an outbound call campaign, all or a portion of the call is serviced by one or more contact center applications in the remote computing environment 24 over a media path 17. According to one embodiment, the contact center applications for a particular tenant may be transitioned/moved from one remote computing environment 24 to another, in the same or different region, in a seamless manner. The assignment of the applications to tenants may be dynamically controlled based on demand and availability of the applications. The contact center applications may also be shared amongst different contact centers.

Media traffic may be exchanged between customers/agents and the server system 30 over the media path 17 in response to invoking the contact center applications in the remote computing environments 24. A majority of the voice communication, however, is conducted over a media path 20 that connects the agents and customers over the private networks, but does not traverse the remote computing environment. Thus, the communication that traverses the media path 20 is generally not affected by any potential traffic or unhealthy status of the network connection 26 between the dedicated communications network 10 and the remote computing environment 24. In this regard, in the embodiment where cloud servers are utilized, the system in FIG. 1 may be described as a hybrid cloud system where infrastructure and applications for handling calls to and from a contact center are distributed between the dedicated communications network 10 and cloud servers in the remote computing environment 24.

According to one embodiment, agents 12 may also access contact center applications in the remote computing environment 24 over a public wide area network 32 such as, for example, the Internet. For example, the agents may conduct less time sensitive actions such as receiving and responding to email, engaging in chat sessions, retrieving customer and/or statistics data, engaging in third party call controls, and the like, over the public wide area network 32.

According to one embodiment, the server system 30 in the remote computing environment 24 is configured to monitor different segments of the network for managing media traffic. The monitoring is configured to obtain information on the status of the different segments including, without limitation, bandwidth consumption, jitter, latency, and the like. For example, the server system may monitor the status of the tenant MPLS link 34 and/or the SIP trunk link 38. The server system 30 may also monitor the status of the shared network connection (tenant network connection) 28 between the private networks 16 and the dedicated communications network 10. The server system 30 may further monitor the status of the shared network connection 26 between the dedicated communications network 10 and the remote computing environments 24. Based on such monitoring, the server system 30 may be configured to trigger one or more appropriate system reactions.

For example, upon detecting a shortage of a shared resource, such as, for example, shortage of the shared bandwidth of the network connection 26 between the dedicated communications network 10 and a current remote computing environment 24, the system may be configured to offload future media traffic to a peer remote computing environment so that the server system in that peer remote computing environment can service the future media traffic instead of the server system in the current remote computing environment.

The re-directing of the media traffic may be performed by a traffic management module running one or more traffic management algorithms that take into account the types of media services to be provided such as, for example, voice treatments to be provided for agents engaged in outbound campaigns, voice treatments to be provided for inbound calls, conference call management, and the like. The traffic management algorithms may also take into account the class of service ordered by the various tenants so that offloading is not only based on the type of media service to be provided, but the class of service subscribed by tenants for whom the media service is to be provided. For example, the traffic management algorithm may select voice treatments for outbound campaigns as the type of media service to be offloaded first to the peer remote computing environment. For such voice treatments, the traffic management algorithm may determine that bronze level tenants are affected first by the offloading as having the lowest class of service, followed by silver and, eventually, gold level tenants.

With respect to the monitoring of the status of the tenant MPLS link 34, such monitoring may aid a tenant to graciously resolve an "over-booking" issue. In this regard, a tenant may subscribe to a traffic burst management service provided by the system. When an unexpected burst of calls to be handled by the agents of the subscribing contact center is detected by the server system, the server system may invoke the appropriate traffic management algorithm for applying service degradation measures for the tenant to ensure that established and projected conversations are provided with proper quality of service. Such service degradation measures may be set by default by the system and/or customized by the tenant. The service degradation measures may include, for example, canceling an outbound campaign, activating a "sorry" greeting for new inbound calls by customers, and the like.

Figure 2:
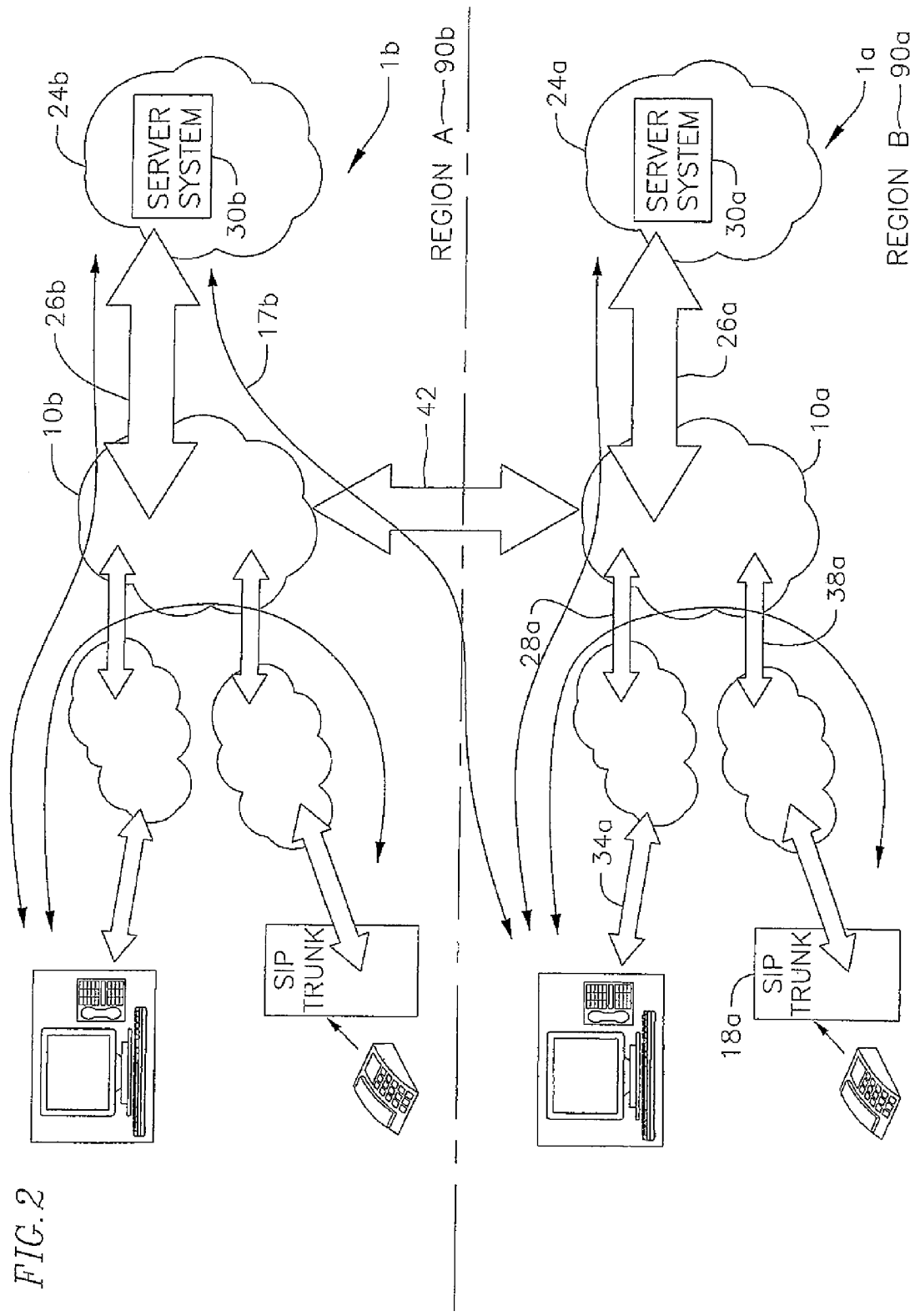
FIG. 2 is a schematic block diagram of two geographic regions each supporting a system for dynamic management and redistribution of contact center media traffic according to one embodiment of the invention.

FIG. 2 is a schematic block diagram of two peer regions 90a, 90b each supporting a system 1a, 1b for dynamic management and redistribution of contact center media traffic according to one embodiment of the invention. Systems 1a, 1b are similar to the system 1 described with respect to FIG. 1. The dedicated communications network 10a of the local region 90a, is coupled to the dedication communications network 10b of the peer region 90b over a network link 42. According to one embodiment, the network link 42 connects the dedicated communications network 10a of the local region 90a, to the dedicated communications network 10b of the peer region 90b. According to one embodiment, the peer regions 90a, 90b are geographically dispersed.

According to one embodiment, the server system 30a in the local region 90a monitors the bandwidth and/or other health status of the connection 26a between the dedicated communications network 10a and the remote computing environment 24a in its region. In the event the connection status satisfies a preset threshold or otherwise indicates that a system reaction is required, the server system 30a selects the peer region 90b to gradually offload future voice communications. The selection of the peer region 90b is based on a peer selection algorithm which, among other things, takes into account the bandwidth and/or status of the network link 42 connecting the dedicated communications network of the local region 90a to the dedicated communications network of the peer region, allowed bandwidth for media offload in the peer region, round trip response time of the server system 30b in the peer region, status of redundant connections in the peer region, and the like. The voice communication that is selected to be offloaded depends on the type of voice communication, the tenants that are involved, the class of service ordered by the tenants, and other parameters set forth by the traffic management algorithm.

Once the peer region 90b is selected, the server system 30a in the local region 90a signals the server system 30b in the peer region to service the calls selected by the traffic management algorithm. In response to such signaling, a media path 17b is established between an agent/end user in the local region 90a, and the server system 30b in the peer region 90b. The media path 17b is used to service the offloaded call via one or more contact center applications in the peer server system 30b.

Figure 3A:
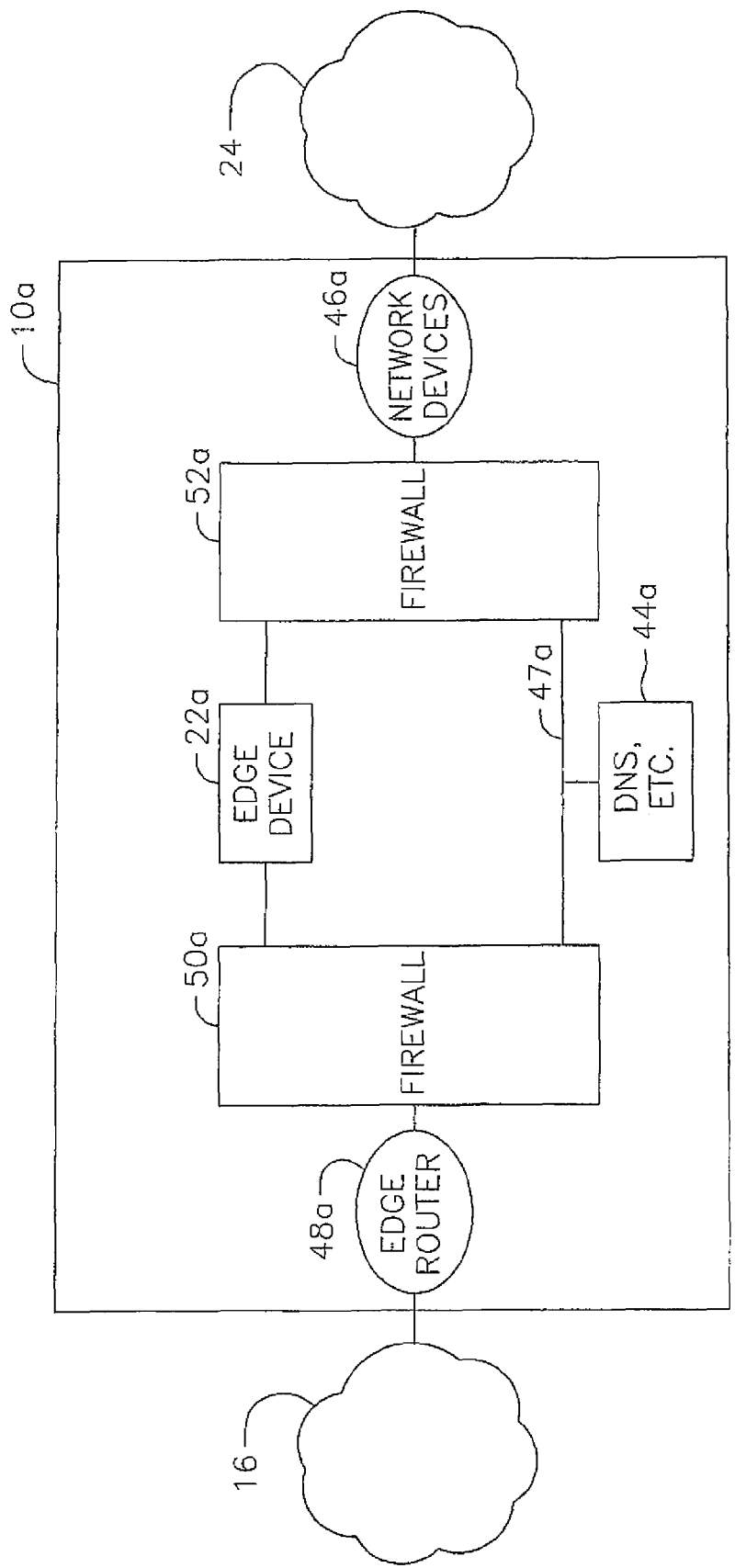
FIG. 3A is a schematic block diagram depicting details of the dedicated communications network according to one embodiment of the invention.

FIG. 3A is a schematic block diagram depicting details of a dedicated communications network 10a according to one embodiment of the invention. The dedicated communications network 10a includes an edge device 22a coupled to one or more first firewalls 50a and one or more second firewalls 52a. The dedicated communications network 10a accesses external networks such as, for example, the private networks 16, over an edge router 48. The dedicated communications network 10a may also include other network devices 46a as will be apparent to a person of skill in the art.

According to one embodiment, the edge device 22a is a session border controller which controls signaling and media streams involved in setting up, conducting, and tearing down voice conversations or other media communications. Any session border controller conventional in the art may be used to implement the edge device 22a. In this regard, the session border controller includes a processor executing software instructions and interacting with other system components to control voice or other media communications. The session border controller also includes an addressable memory for storing software instructions to be executed by the processor. The memory is implemented using a standard memory device, such as a random access memory (RAM).

According to one embodiment, the edge device 22a receives call signaling messages for setting up or tearing down a call. Such signaling messages may include SIP signaling data such as, for example, INVITE, TRYING, REFER, ACK, 100, 200, BYE, etc., and/or SDP payload data such as, for example, IP addresses and port numbers used for the call. The edge device 22a also receives media streams which carry the call's audio, video, or other data transmitted using RTP or other similar media communication protocol conventional in the art, along with information on call statistics, quality, and the like. Together, these streams make up a session which is controlled by the edge device. Once a connection is established between a customer and an agent, the edge device 22a establishes the media path 20 for carrying a voice conversation between the customer and the agent.

The firewalls 50a and 52a coupled to the edge device 22a allow the handling of security of voice conversations between, respectively, the private networks 16 and the dedicated communications network 10, and the remote computing environments 24 and the dedicated communications network. Any firewall conventional in the art may be used to implement the firewalls 50a, 52a. According to one embodiment of the invention, data traffic does not traverse the edge device 22a and instead, traverses the two firewalls 50a, 52a over link 47a. Additional devices 44a may be coupled in between the two firewalls 50a, 52a for rendering additional functionality needed for transmitting the data traffic. Such functionality may include, for example, DNS (Domain Name System) functionality for translating a domain name into an IP address.

Figure 3B:
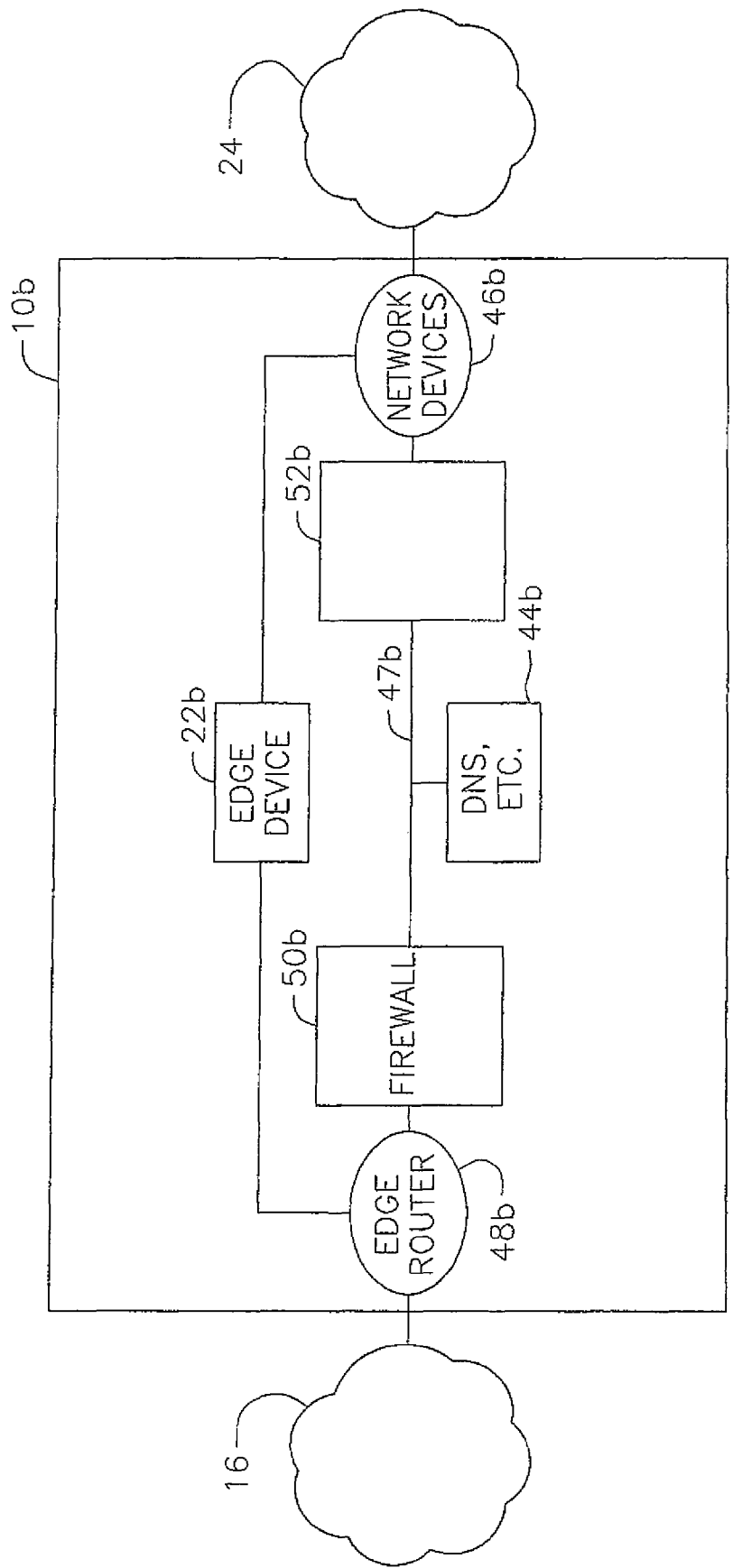
FIG. 3B is a schematic block diagram depicting details of the dedicated communications network according to another embodiment of the invention.

FIG. 3B is a schematic block diagram depicting details of a dedicated communications network 10b according to another embodiment of the invention. The dedicated communications network according to this embodiment includes an edge device 22b, firewalls 50b, 52b, edge router 48b, link 47b, and network devices 46b which are similar to the edge device 22a, firewalls 50a, 52a, edge router 48a, link 47a, and network devices 46a of FIG. 3A. However, according to this embodiment, the edge device 22b is already configured with firewall features so that connection to additional hardware firewalls 50b, 52b are not required for providing security for voice conversations. The firewalls 50b, 52b, however, are still used for providing security for data traffic traversing the dedicated communications network 10b.

Figure 4:
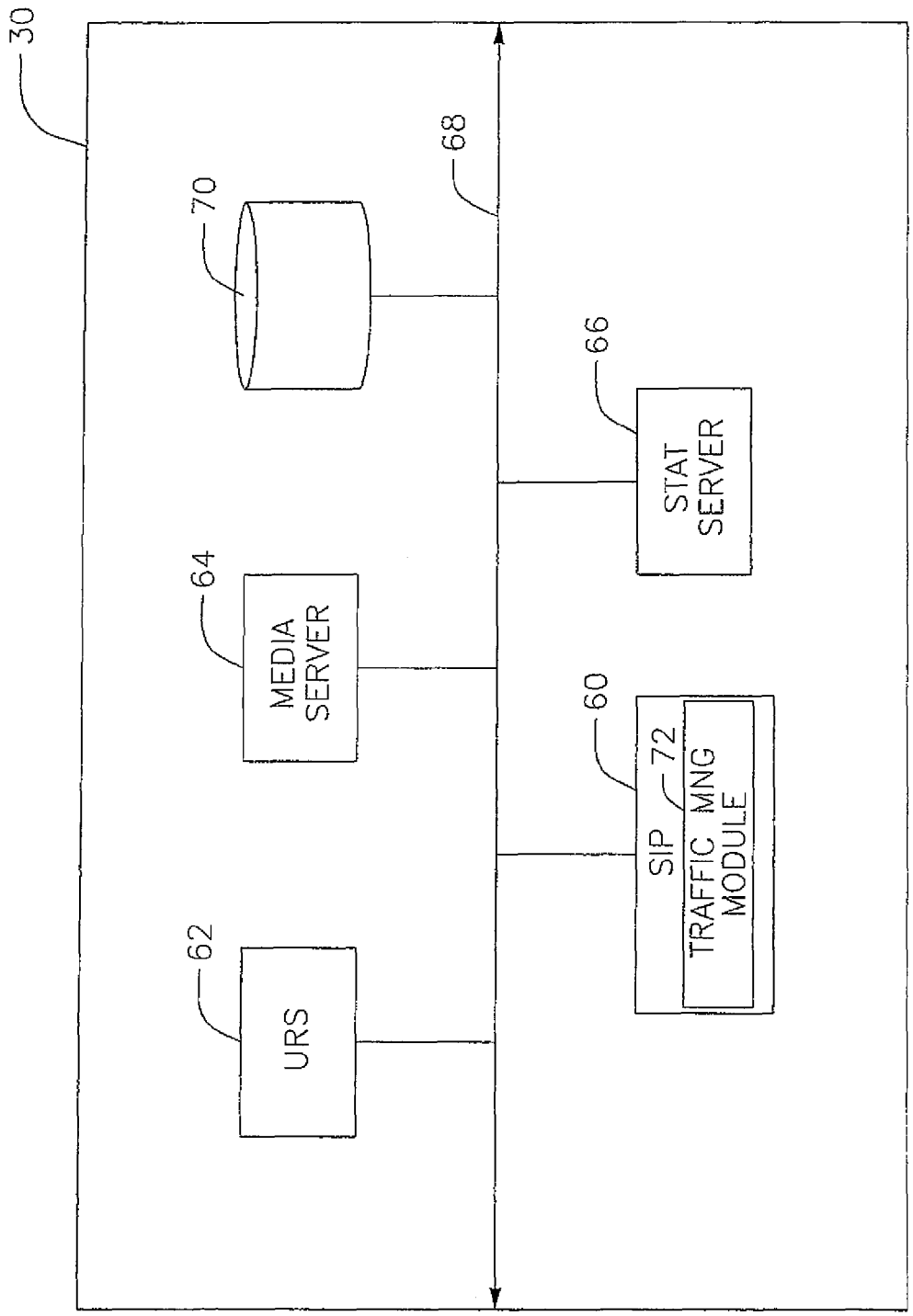
FIG. 4 is a more detailed schematic block diagram of a server system in a remote computing environment according to one embodiment of the invention.

FIG. 4 is a more detailed schematic block diagram of the server system 30 in the remote computing environment 24 according to one embodiment of the invention. The server system 30 includes without limitation, a SIP server 60, universal resource server (URS) 62, media server 64, and statistics server 66. According to one embodiment, the servers 60-66 of the server system are implemented as software components deployed on a single instance of a virtual server. The single instance of the virtual server may be implemented via standard hardware components such as, for example, one or more processors, disks, memories, and the like. Although the servers 60-66 are assumed to be separate functional units, a person of skill in the art will recognize that the functionality of two or more servers may be combined or integrated into a single server, or further subdivided into additional server components without departing from the spirit of the invention. In addition, although the servers 60-66 of the server system are depicted as being connected over a data communications bus 68, a person of skill in the art should recognize that there would be no communication among the servers if they were implemented to reside in a single physical device (e.g. a single processor). In addition, a person of skill in the art should recognize that the server system 30 is scalable and may include a considerable number of servers 60-66 sharing a set of storage devices 70. Thus, the particular implementation of the server system 30 depicted in FIG. 4 is solely for illustration purposes, and do not preclude other arrangements or components that will be evident to a person of skill in the art.

According to one embodiment, the SIP server 60 is configured to receive call signaling messages (e.g. SIP INVITE messages) from the edge device 22, media server 64, URS 62, and the like, for controlling the setting up or termination of a call.

The statistics server 66 provides real time states and statistics for one or more call centers, including agent availability, call handling time, estimated waiting time in queue, and other statistical information associated with call center functions. In this regard, the statistics server has access to one or more mass storage devices 70 storing call center data and software programs useful for one or more contact centers. The one or more mass storage devices 70 may be implemented as hard disk drives or other suitable mass storage devices conventional in the art.

The URS 62 may be configured to access the statistics server 66 to identify agents based on skills, availability, and the like, for inbound and/or outbound calls, and forward call signaling messages to the SIP server 60 to transmit call requests to the identified agents.

The media server 64 is configured to identify parameters (e.g. available media ports on the media server) for establishing voice conversations between agents and customers, and provide those parameters to the SIP server for delivering to the edge device, customers, and agents. The media server 64 is also configured to deliver media to customers and/or agents via the edge device 22. For example, the media server 64 may be invoked to provide initial greeting messages to a calling customer, and for obtaining basic customer information (e.g. identification information, reason for the call, etc.). Also, if the customer or agent is placed on hold, the media server 64 may be invoked to play music for the holding customer or agent. In another example, if a conversation between a customer and agent is to be recorded, the call may traverse the media server so that the customer and agent engage in a three way conversation with the media server, and the media server records the conversation and stores it in the mass storage device 70.

According to one embodiment of the invention, the SIP server 60 includes a traffic management module 72 for providing traffic burst management services for one or more tenants of the system. In this regard, the module is configured to monitor various network segments, determine a status for the various segments, and provide management and redirection services based on the determined status. Although in the illustrated embodiment the traffic management module 72 is depicted as being hosted by the SIP server 60, a person of skill in the art should recognize that the module may also be hosted by one or more other servers of the server system 30. Also, the functionality of the traffic management module 72 may be subdivided into sub-modules, each sub-module being hosted in a single server or distributed among various servers of the server system 30.

According to one embodiment, the traffic management module 72 is configured to monitor the following network segments and their connectivity:

Tenant network connectivity:
  Bandwidth of the tenant MPLS link 34a.
  Network connectivity of the local region 90a (FIG. 2) and network connectivity of a peer region 90b:
    Provisioned bandwidth of the network connection 26a between the remote computing environment 24a and the dedicated communications network 10a in the local region 90a;
    Provisioned bandwidth of the network link 42 between dedicated communications network 10a of the local region and the dedication communications network 10b of the peer region;
    Provisioned bandwidth of the network connection 26b between the remote computing environment 24b and the dedicated communications network 10b in the peer region;
    Provisioned bandwidth of the SIP trunk link 38a between the SIP trunk equipment 18a and the dedicated communications network 10a in the local region;
    Provisioned bandwidth of the network connection 28a between the dedicated communications network 10a and tenants in the local region.

According one embodiment, the traffic management module 72 identifies the connections that get impacted when a call reaches a call progress state, and calculates the portion of the bandwidth that is consumed for the impacted connections. According to one embodiment, the available bandwidth of a particular connection is equal to the provisioned bandwidth (minus a portion pre-allocated for SIP signaling). Every established voice conversation decreases the available bandwidth in one or more segments of the network. Finished voice conversations release the consumed bandwidth and increase the available bandwidth.

Specifically, every voice conversation involving an agent 12 decreases the available bandwidth of the tenant MPLS link 34a, and the available bandwidth on the network connection 28a between the dedicated communications network 10a and the tenants in the local region, which is shared among the various tenants.

Every voice conversation involving the server system 30a in the local region decreases the available bandwidth of the network connection 26a between the remote computing environment 24a and the dedicated communications network 10a in the local region.

Every voice conversation involving an end user 14 in the local region decreases the available bandwidth of the SIP trunk link 38a between the SIP trunk equipment 18a and the dedicated communications network 10a in the local region.

Every voice conversation offloaded to the server system 30b in the peer region 90b decreases the available bandwidth of the network link 42 between the local data communications network 10a and the data communications network 10b of the peer region, and the available bandwidth of the connection between remote computing environment 24b and the dedicated communications network 10b in the peer region.

According to one embodiment, the server system 30 maintains a count of established voice conversations and associates their impact on the network. In this manner, the server system monitors the status of different connections and/or operational status of the entire network topology, detecting bottlenecks within the network and other ailments in the monitored segments. When a bandwidth threshold is reached for one or more monitored network connections, the server system 30 applies appropriate measures selected by the traffic management algorithm.

Figure 5:
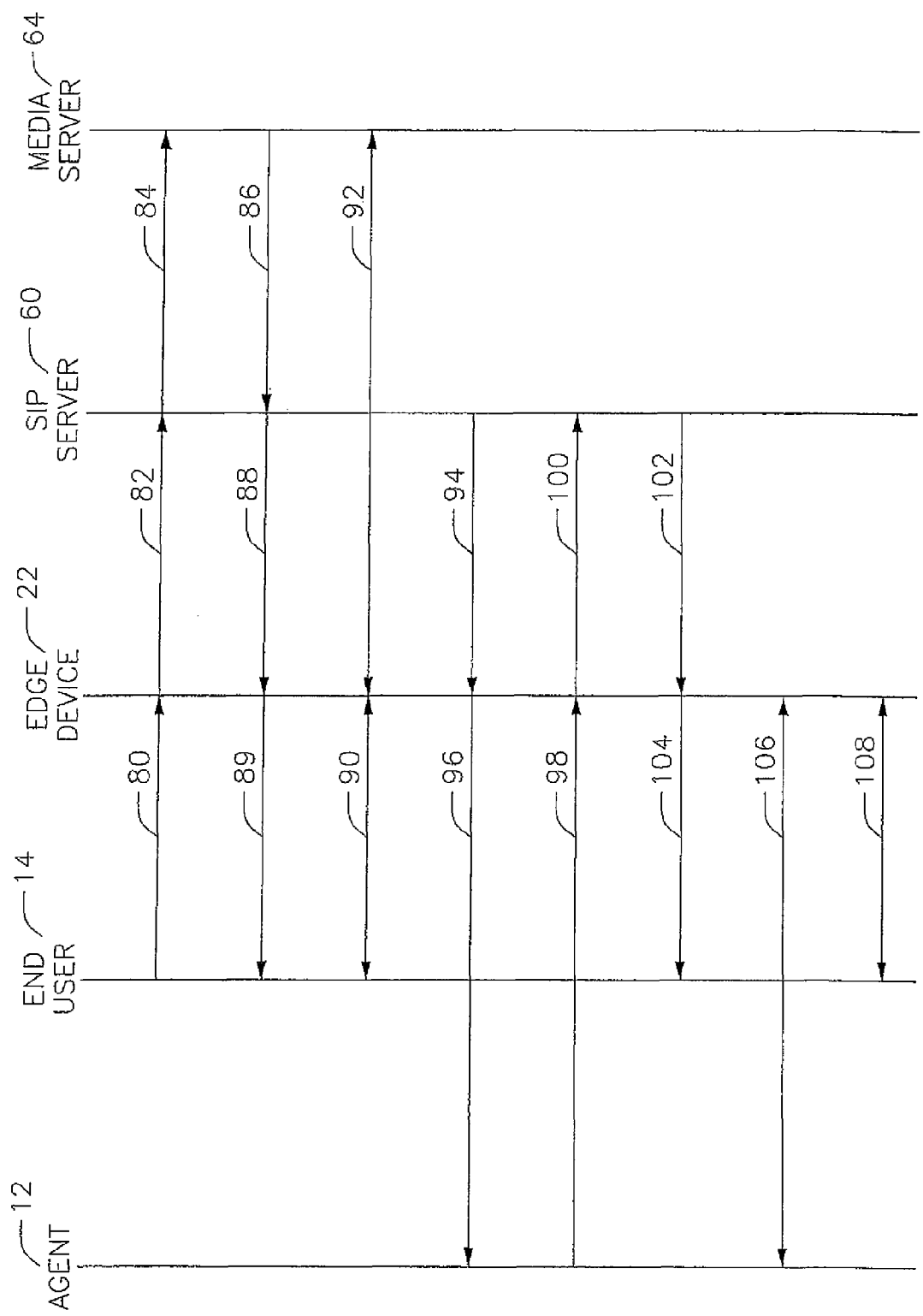
FIG. 5 is a schematic diagram depicting a flow of signals between various components of the system of FIG. 1, for processing an inbound call from an end user to a contact center according to one embodiment of the invention.

FIG. 5 is a schematic diagram depicting the flow of signals between the various components of the system for processing an inbound call from an end user 14 to a contact center according to one embodiment of the invention. In step 80, the end user 14 transmits a packet with a request for a call conversation (e.g. a SIP INVITE) to the edge device 22, and the requested conversation causes utilization of the SIP trunk link 38. The edge device processes the packet according to well known mechanisms, and in step 82, sends a converted packet to the SIP server 60 over the network connection 26. In step 84, the SIP server 60 forwards the packet to the media server 64.

If the media server 64 is available to identify an available port for voice conversation, call parameters for establishing the voice conversation via the identified port are sent back to the SIP server 60 in step 86.

The SIP server 60 in turn passes the parameters to the edge device 22 over the network connection 26 in step 88, and the edge device passes the parameters to the end user 14 in step 89. An RTP media path 17 (via steps 90 and 92) is then established between the end user 14 and the media server 64 in the remote computing environment 24, via the edge device 22. The media server 64 transmits over the media path an initial greeting and other voice treatments for prompting the end user 14 to provide identification information and/or reasons for the call. Over the media path 17, the end user provides such information to the edge device 22, which then forwards the information to the media server 64.

Although not depicted in FIG. 5, the SIP server 60 communicates with the URS 62 which in turn communicates with the statistics server 66 for determining an agent to which the call is to be forwarded. The determination of such agent may be based on available agents, their skill, and the like. Once such an agent is identified, the SIP server 60 transmits a message to the edge device 22 in step 94, which then signals the selected agent 12 in step 96.

In response to the signaling, in step 98, the agent forwards his parameters for the voice conversation to the edge device 22. The edge device forwards the parameters to the SIP server in step 100, using SIP signaling understood by the SIP server. The SIP server re-invites the end user 14 for the conversation with the agent by transmitting a SIP packet to the end user in steps 102 and 104, via the edge device 22. This conversation utilizes bandwidth on tenant links 28 and 34. Once the end user accepts the invitation, the RTP media path 20 which is controlled by the edge device 22 is established (via steps 106 and 108) between the agent 12 and the end user 14. This media path does not traverse the network connection 26 to the remote computing environment 24.

Figure 6:
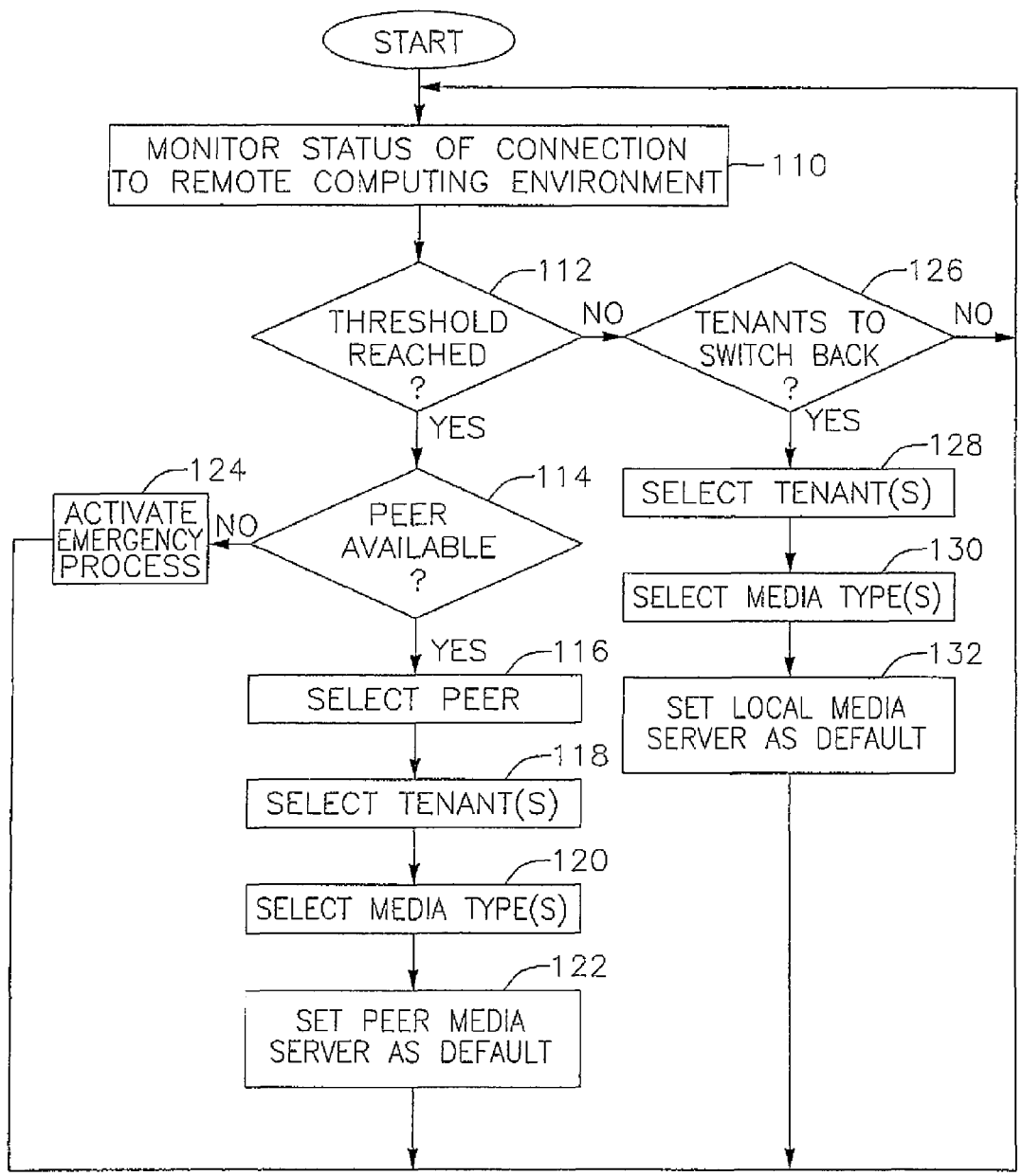
FIG. 6 is a flow diagram of an offload process implemented by a traffic management module according to one embodiment of the invention.

FIG. 6 is a flow diagram of an offload process implemented by the traffic management module 72 of the server system 30 according to one embodiment of the invention. According to the process, the traffic management module monitors, in step 110, status of various network segments including status of the network connection 26a between the dedicated communications network 10a and the remote computing environment 24a. Such monitoring may be done in real time and may include, for example, determination as to the number of active calls in progress which are currently being handled by a media server 64 in the local region, and a determination of the type of media service being rendered for each call. This information may be used to calculate a total amount of bandwidth consumed for the network connection 26a, and to further estimate growth of call flows involving the local media server. The general "health" of the network connection 26a may also be monitored, in addition or in lieu of the bandwidth saturation. For example, the system may perform regular SNMP-based monitoring of the network devices providing redundant network connections between the communications network 10a and the server system 30a.

In step 112, a determination is made as to whether a threshold or other criteria for offloading has been satisfied. For example, the traffic management module may determine whether the bandwidth saturation of the network connection 26a has reached a certain level. If the answer is YES, the traffic management module, in step 114, determines whether there is a peer region available for selection from one or more remote regions to which gradually offload media. According to one embodiment, the selection of the peer region is based on a peer selection algorithm which takes into account one or more parameters, such as, for example, the geographic location of the remote regions, bandwidth saturation of the network link 42 connecting the local region to the remote regions, allowed bandwidth for media off-load in the remote regions, roundtrip response time of the remote media server, status of the redundant connections at the remote regions, and the like.

If a peer region is available for selection, the traffic management module selects an appropriate peer in step 116.

In step 118, the traffic management module 72 selects one or more tenant(s) whose media is to be offloaded. The selection of the particular tenant may be based on the class of service ordered by the tenant. For example, the traffic management module may be configured to select tenants associated with the lowest (bronze) class of service and initially offload media connection requests for these types of tenants to the selected peer region. The level of service provided to a tenant out of the peer region is configured to match the level of service the tenant had prior to the offloading.

In step 120 the traffic management module is configured to select one or more different types of media to be offloaded first for the selected tenant. According to one embodiment, the order in which different types of media are offloaded may be set by default. For example, media provided to agents during an outbound campaign may be selected first by default for offloading since the quality or latency of such media to the agents is not critical. The tenants may also indicate their preference as to the order in which different types of media are to be offloaded, in each tenant's profile record stored in the mass storage device 70.

In step 122, the traffic management module sets an identifier of the media server of the selected peer region as the default media server for servicing the selected media type of the selected tenants. The media identifier may be stored, for example, in the profile record of the selected tenants, in association with the selected media type. Thereafter, requests to the local SIP server 60 requiring servicing by a contact center application in a media server are redirected to the peer media server over the network link 42 in a seamless manner.

Referring again to step 114, if a peer region is not available for selection, the traffic management module 72 activates an emergency process in step 124. The emergency process may entail, for example, canceling all outbound campaigns, delivering new call to an available agent without initial treatment, instructing the local SIP Server 60 to refuse all inbound calls, and the like.

Referring again to steps 110 and 112, if the monitoring of the status of the network connection 26a indicates that the threshold or other criteria for offloading has not been satisfied (e.g. there is sufficient bandwidth on the network connection 26a), the traffic management module determines in step 126 whether any tenants have calls redirected to a peer region. If the answer is YES, the traffic management module selects, in step 128, one or more tenants to revert back to the local region. The selection of such tenants may depend, for example, on the class of service subscribed, the different geographic locations of the peer regions (if more than one) to which the tenants have been redirected, and the like.

In step 130, the traffic management module selects one or more redirected media types to revert back to the local region.

In step 132, the traffic management module sets an identifier of the media server of the local region as the default media server for servicing the selected media type(s) of the selected tenant(s). The media identifier may be stored, for example, in the profile record of the selected tenant(s).

In addition or in lieu of monitoring and managing traffic traversing the network connection 26, the traffic management module also monitors bandwidth of a tenant for managing traffic bursts on a per tenant basis. In this regard, the mass storage device maintains information about each tenant in a tenant profile record stored in the mass storage device 70.

FIG. 7 is a semi-schematic, conceptual layout diagram of a portion of a tenant's profile record 400 providing information on call resources available to the tenant according to one embodiment of the invention. The information in the record 402 may be provided by the tenant when subscribing to one or more call center services, or automatically deduced from monitoring activities of each tenant. In the illustrated embodiment, the record 400 stores a typical number of simultaneous voice conversations handled by the tenant 402, a maximum expected number of voice conversations 404, a maximum number of agents for which the tenant's call center is configured 406, and a number of actual agents 408 that the tenant is providing along with information on their skill level (regular 410 or skilled 412). The record 400 further stores a number of maximum number of supervisors for which the tenant's call center is configured 414, and a number of actual supervisors that the tenant will provide 416.

Figure 8:
FIG. 8 is a semi-schematic, conceptual layout diagram of another portion of a tenant's profile record for storing information on bandwidth characteristics of a tenant MPLS link subscribed to by the tenant for connecting to a dedicated communications network according to one embodiment of the invention.

FIG. 8 is a semi-schematic, conceptual layout diagram of another portion of a tenant's profile record 140 for storing information on the bandwidth characteristics of the tenant MPLS link 34 subscribed to by the tenant for connecting to the dedicated communications network 10 according to one embodiment of the invention. For example, the record 140 may indicate a regular bit rate at the tenant premises 142, available normal traffic burst bandwidth 144, and available extended burst bandwidth 146. The record 140 may also provide information on the physical media bandwidth limit 148 of the MPLS link 34. According to one embodiment, the burst levels are managed by the provider of the private network 16. Exceeding the extended burst level 146 generally causes dropping of packets controlled by the provider's bandwidth management policies. Exceeding the physical media bandwidth 148 also leads to the dropping of packets by the hardware involved.

FIG. 9 is a semi-schematic, conceptual layout diagram of a bandwidth consumption table 150 storing information on the bandwidth of the tenant MPLS link 34 that is estimated to be consumed for a particular tenant according to one embodiment of the invention. The bandwidth consumption is estimated based on the known codec used by the tenant. In the illustrated example, each row of the table provides information, at a particular point in time, as to a total number of end-customers that were served 152 by engaging in a voice conversation, a total number of voice conversations 154 that were simultaneously established at that time, and estimated bandwidth consumption 156 for the simultaneously established voice conversations. The estimated bandwidth consumption for the simultaneously established voice conversations is further broken down to identify an estimated bandwidth consumed for voice traffic only 158, and an estimated total bandwidth consumption 160 including bandwidth consumed for SIP signaling, and the like. For the established voice conversations, the table also breaks down the conversations based on the conversation type (e.g. direct conversations 160, multi-party conversations 162, consult calls 164, supervised calls 166, outbound campaigns 168, and the like). According to one embodiment, the conversation type is not considered in the bandwidth consumption calculation and thus, may be omitted from the table; each conversation consumes equal amount of bandwidth regardless the conversation type. The table 150 further tracks a number of agents 170 engaged in each type of conversation. According to one embodiment, the traffic management module 72 updates the table in real time as voice conversations are initiated and terminated. Alternatively, the traffic management module 72 may be configured to periodically conduct a survey to determine the bandwidth consumption of the tenant MPLS link 34 at the time of the survey.

The bandwidth consumption depends on the manner in which the calls are handled. In some cases, there might be sufficient bandwidth for ten end customers to be served. In other cases, there may not be enough bandwidth for even eight customers. For example, for a tenant with a profile depicted via FIGS. 7 and 8, entry 172 illustrates a situation where the tenant served even more end customers than planned (i.e. had voice conversations with 12 customers when the maximum expected number of voice conversations 124 (FIG. 7) was ten). However, there was still enough bandwidth for the conversations since the 12 conversations were direct conversations via media path 20 (FIG. 1) consuming 1.28 Mbps, which is below the 1.5 Mbps physical media limit available to the tenant. All top rows 174 of the table indicate that the bandwidth consumed by the conversations was below the 1.5 Mbps physical media limit available to the tenant. The middle rows 176 of the table indicate that the consumed bandwidth was at the physical media limit. The bottom rows 178 of the table indicate that even though staffing (e.g. number of agents and supervisors) was within the ordered limits as depicted in FIG. 7 (15 agents and two supervisors), and the number of calls from, end customers was also within the ordered limits (ten customers), the amount of bandwidth consumed due to the type of calls being serviced was high, causing it to exceed the 1.5 Mbps physical media limit available for the voice conversations. In this case, quality of established voice conversations is lost, and the tenant often experiences dropping of packets and the like. A bandwidth upgrade for the tenant MPLS link 34 is thus often required.

According to one embodiment of the invention, a tenant may subscribe to a traffic burst management service for controlling the service degradation to its customers when there is an over consumption of bandwidth of the tenant MPLS link 34, as is reflected via the bottom rows of the bandwidth consumption table 150 of FIG. 9. Whether the tenant has subscribed to such a service may be determined by examining the tenant's profile record. A subscribing tenant may be prompted, electronically or otherwise, to provide the bandwidth subscription information for storing in the record 140 of FIG. 8.

Figure 10:
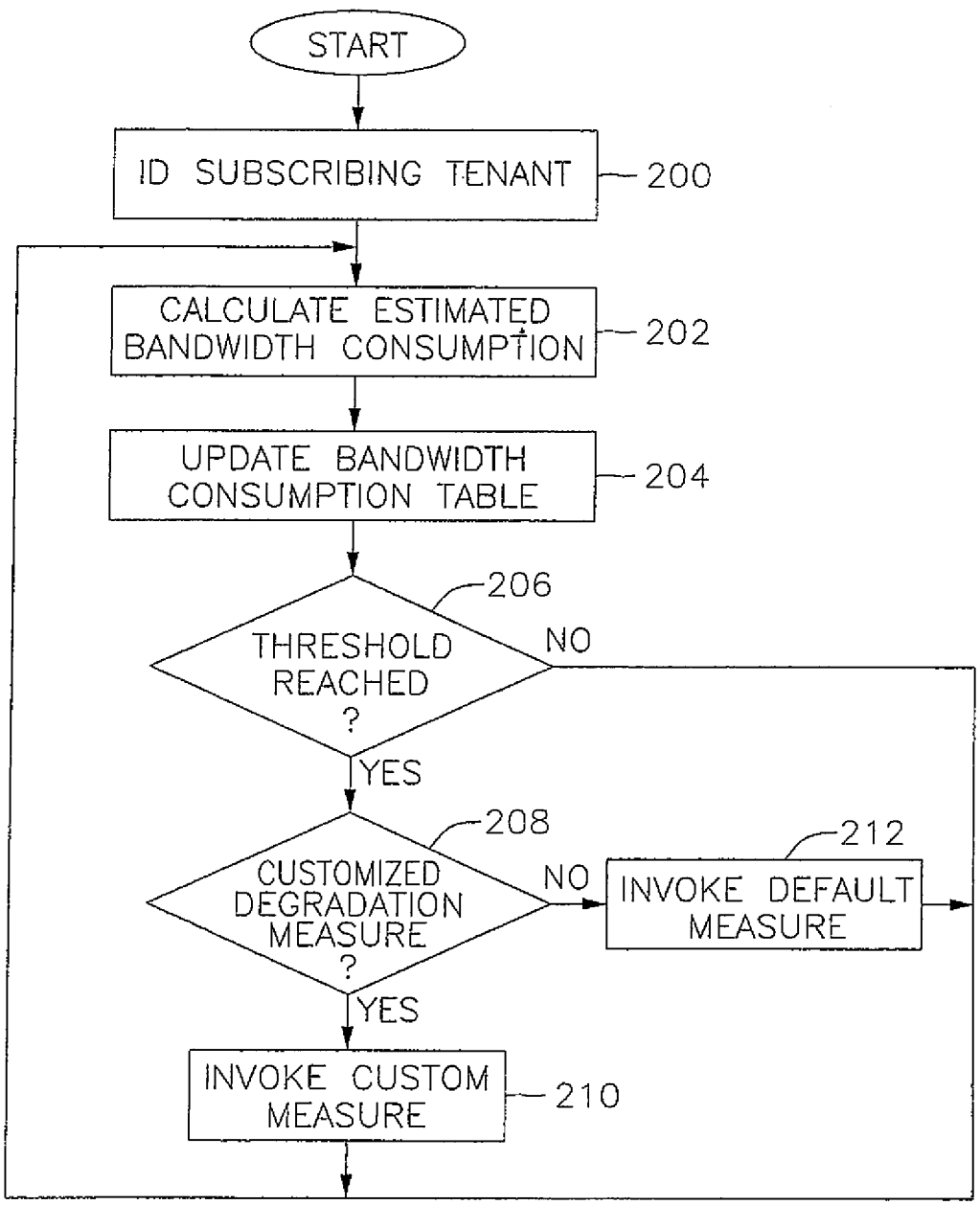
FIG. 10 is a flow diagram of a process executed by a traffic management module for managing traffic bursts on a per tenant basis according to one embodiment of the invention.

FIG. 10 is a flow diagram of a process executed by the traffic management module 72 for managing traffic bursts on a per tenant basis according to one embodiment of the invention. In step 200, the traffic management module identifies a tenant subscribed to the traffic burst management service. This may be done, for example, by examining an appropriate field of each tenant's profile record for an indication that the tenant has subscribed to such a service.

In step 202, the traffic management module 72 calculates the estimated bandwidth consumption of the tenant MPLS link 34. In this regard, the traffic management module determines a number of simultaneously established voice conversations traversing the tenant MPLS link 34, regardless of the type of conversations being conducted. A total estimated bandwidth consumption is then calculated based on the number of voice conversations.

In step 204, the tenant's bandwidth consumption table 150 (FIG. 9) is updated with the calculated information.

In step 206, the traffic management module 72 determines whether a threshold bandwidth consumption amount has been satisfied. The threshold may be provided by the tenant or calculated automatically by the traffic management module based on the bandwidth characteristics of the tenant MPLS link 34 stored in the record 140 (FIG. 8). For example, the traffic management module 72 may automatically calculate the threshold as a preset percentage (e.g. 75%) of the physical media bandwidth limit purchased by the tenant.

If the threshold bandwidth consumption level has been satisfied, a determination is made in step 208 as to whether the tenant has provided a customized service degradation measure/plan. If the answer is YES, the traffic management module invokes the customized degradation measure. Otherwise, the traffic management module selects a default degradation measure.

Regardless of whether the degradation measure is customized or a default, the traffic management module is configured to apply the measure to future voice conversations traversing the tenant MPLS link 34. For example, the degradation measure may start with canceling an outbound campaign on behalf of the tenant until additional bandwidth of the tenant MPLS link becomes available. In this regard, the traffic management module 72 identifies an outbound campaign for the tenant based on the tenant identification information, and either cancels the campaign or reschedules it for another time and/or date. If there are no outbound campaigns to cancel/reschedule, the degradation measure may activate "sorry" greetings toward new inbound calls of end customers 14. Thus, instead of abruptly refusing new calls, the "sorry" greetings may more graciously turn down such new calls, redirect the call to a voice mail system, and may even request a call back number that an agent may call at a later time.

Figure 11:
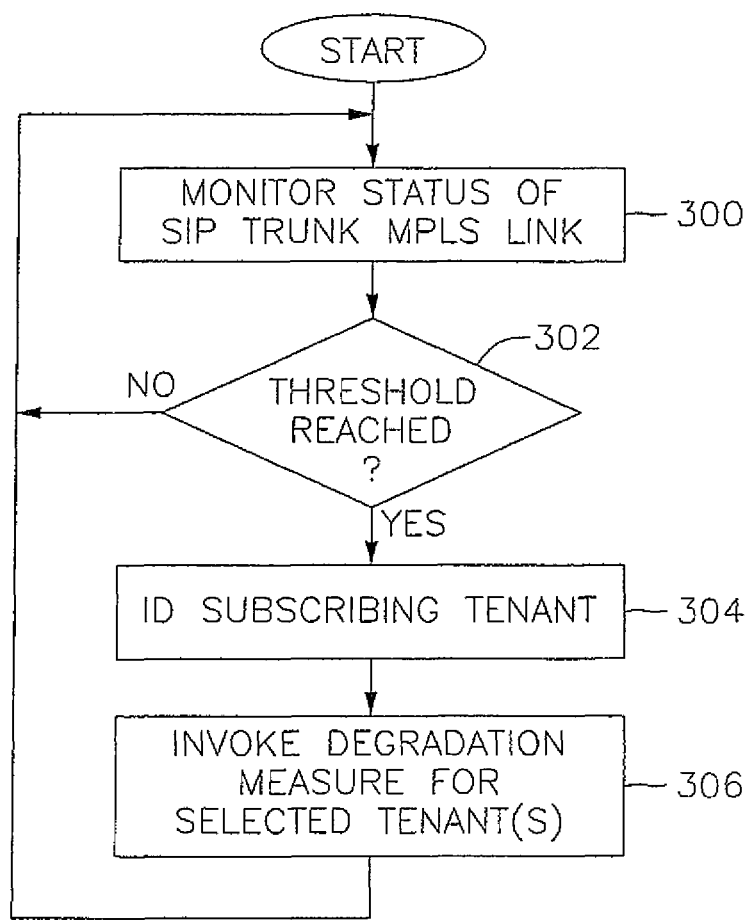
FIG. 11 is a flow diagram of a process for managing unexpected call rate bursts for an entire system according to one embodiment of the invention.

According to one embodiment, the traffic management module 72 is also configured to gracefully manage unexpected call rate bursts in the entire, system. FIG. 11 is a flow diagram of a process for managing unexpected call rate bursts for the entire system according to one embodiment of the invention. The process starts, and in step 300, the traffic management module monitors the status of the SIP trunk link 38. Such monitoring may include, for example, determination as to the number of simultaneously established voice conversations with an end-user 14 for the entire system, and the type of calls that are being conducted. Based on this information, the traffic management module may be configured to calculate a total amount of bandwidth consumed for the SIP trunk link 38.

In step 302, the traffic management module makes a determination as to whether a threshold bandwidth consumption amount has been satisfied. The threshold may be calculated automatically by the traffic management module based on the bandwidth characteristics of the SIP trunk link 38. For example, the traffic management module 72 may automatically calculate the threshold as a preset percentage (e.g. 75%) of the physical media bandwidth limit of the SIP trunk link.

If the threshold bandwidth consumption level has been satisfied, a tenant is selected in step 304 for invoking a service degradation measure for the selected tenant. In this regard, the traffic management module identifies for each tenant, the level of service/class of service ordered by the tenant. This information may be stored, for example, in each tenant's profile record. The record may indicate that the tenant has ordered a bronze, silver, or gold level service. The traffic management module may be configured to select tenants with a lower level of service (e.g. bronze level tenants) prior to selecting tenants of a higher level of service (e.g. silver or gold level tenants).

In step 306, the traffic management module is configured to invoke a service degradation measure for the selected tenant(s). The service degradation measure may be similar to the service degradation measure discussed above with respect to FIG. 10.

According to one embodiment, although the monitoring in FIGS. 10 and 11 is described as monitoring the bandwidth consumption of respectively the tenant MPLS link 34 and the SIP trunk link 38, a person of skill in the art should recognize that the general "health" of the tenant and SIP trunk links may also be monitored in addition or in lieu of the bandwidth saturation, similar to the monitoring of the "health" of the network connection 26a as is described above with respect to FIG. 6.

The processes described with respect to FIGS. 6, 10, and 11 may be described in terms of a software routine executed by a processor in the server system 30 based on instructions stored in the server's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the various processes is not fixed, but can be altered into any desired sequence as recognized by a person of skill in the art.

It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A server system for managing media traffic for a plurality of contact centers, the server system comprising:

one or more processors coupled to a communications network; and one or more memory devices coupled to the one or more processors and storing program instructions therein, the program instructions causing the one or more processors to:

identify calls between agents and customers for a plurality of contact centers, the customers having access to communication devices connected to the communications network over a first communications link traversing a first private network, the agents having access to agent devices connected to the communications network over a second communications link traversing a second private network, wherein each of the first and second private networks are configured to provide an anticipated quality of service for calls traversing the respective private network;

determine availability of the second communications link based on the identified calls traversing the second communications link, wherein the instructions that cause the processor to determine the availability includes instructions that cause the processor to determine an estimated available bandwidth of the second communications link by determining an estimated bandwidth consumption of the identified calls traversing the second communications network; and in response to the determined availability of the second communications link, trigger an action with respect to calls associated with contact centers subscribed to a first service level for preserving a particular quality of service for calls associated with contact centers subscribed to a second service level different from the first service level, wherein the calls associated with the first service level are configured to receive a quality of service that is lower than the quality of service received by calls associated with the second service level, and wherein the instructions that cause the processor to determine an estimated bandwidth consumption include instructions that cause the processor to:

compare the estimated bandwidth consumption for the identified calls traversing the second communications link, against a threshold bandwidth consumption amount; and trigger the action in response to determining that the estimated bandwidth consumption for the identified calls traversing the second communications network, satisfies the threshold bandwidth consumption amount.

2. The system of claim 1, wherein the determining the estimated available bandwidth of the second communications link includes determining a physical media limit for the second communications link.

3. The system of claim 1, wherein the action is activating a greeting turning down a new inbound call directed to one of the contact centers subscribed to the first service level.

4. The system of claim 1, wherein the second private network is a multi-protocol label switching network.

5. The system of claim 1, wherein the identified calls are concurrently established calls traversing the second communications network.

6. The system of claim 1, wherein the threshold is based on a physical media bandwidth limit associated with the second communications link.

7. The system of claim 1, wherein the action is a custom action selected by one of the contact centers subscribed to the first service level.

8. The system of claim 1, wherein the action is canceling an outbound campaign for one of the contact centers subscribed to the first service level.

9. The system of claim 1, wherein the action is redirecting a new inbound call directed to one of the contact centers subscribed to the first service level, to an external system.

10. The system of claim 9, wherein the external system is a voice mail system.

11. A method for managing media traffic for a plurality of contact centers, the method comprising:
    identifying, by one or more processors coupled to a communications network, calls between agents and customers for a plurality of contact centers, the customers having access to communication devices connected to the communications network over a first communications link traversing a first private network, the agents having access to agent devices connected to the communications network over a second communications link traversing a second private network, wherein each of the first and second private networks are configured to provide an anticipated quality of service for calls traversing the respective private network;
    determining, by the one or more processors, availability of the second communications link based on the identified calls traversing the second communications link, wherein the determining of the availability includes determining an estimated available bandwidth of the second communications link by determining estimated bandwidth consumption of the identified calls traversing the second communications link; and
    in response to the determined availability of the second communications link, triggering, by the one or more processors, an action with respect to calls associated with contact centers subscribed to a first service level for preserving a particular quality of service for calls associated with contact centers subscribed to a second service level different from the first service level,
    wherein the calls associated with the first service level are configured to receive a quality of service that is lower than the quality of service received by calls associated with the second service level, and
    wherein the determining of the estimated bandwidth consumption includes:
        comparing the estimated bandwidth consumption for the identified calls traversing the second communications link, against a threshold bandwidth consumption amount; and
        triggering the action in response to determining that the estimated bandwidth consumption for the identified calls traversing the second communications network, satisfies the threshold bandwidth consumption amount.

12. The method of claim 11, wherein the determining the estimated available bandwidth of the communications link includes determining a physical media limit for the second communications link.

13. The method of claim 11, wherein the action is activating a greeting turning down a new inbound call directed to one of the contact centers subscribed to the first service level.

14. The method of claim 11, wherein the second private network is a multi-protocol label switching network.

15. The method of claim 11, wherein the identified calls are concurrently established calls traversing the second communications network.

16. The method of claim 11, wherein the threshold is based on a physical media bandwidth limit associated with the second communications link.

17. The method of claim 11, wherein the action is a custom action selected by one of the contact centers subscribed to the first service level.

18. The method of claim 11, wherein the action is canceling an outbound campaign for one of the contact centers subscribed to the first service level.

19. The method of claim 11, wherein the action is redirecting a new inbound call directed to one of the contact centers subscribed to the first service level, to an external system.

20. The method of claim 19, wherein the external system is a voice mail system.

\* \* \* \* \*